(12) United States Patent
Lindemann et al.

(10) Patent No.: US 10,458,483 B2
(45) Date of Patent: Oct. 29, 2019

(54) CLUTCH PLATE ASSEMBLY WITH FRICTION MATERIAL FLAP

(71) Applicant: Schaeffler Technologies AG & Co. KG, Herzogenaurach (DE)

(72) Inventors: Patrick Lindemann, Wooster, OH (US); David Avins, Burbank, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 169 days.

(21) Appl. No.: 15/655,681

(22) Filed: Jul. 20, 2017

(65) Prior Publication Data

US 2018/0023633 A1    Jan. 25, 2018

Related U.S. Application Data

(60) Provisional application No. 62/365,158, filed on Jul. 21, 2016.

(51) Int. Cl.
*F16D 13/68* (2006.01)
*F16H 45/02* (2006.01)
(Continued)

(52) U.S. Cl.
CPC .......... *F16D 13/68* (2013.01); *F16D 13/585* (2013.01); *F16D 69/0416* (2013.01); *F16H 41/24* (2013.01); *F16H 45/02* (2013.01); *F16D 13/64* (2013.01); *F16D 13/66* (2013.01); *F16D 65/127* (2013.01); *F16D 2065/132* (2013.01); *F16D 2069/045* (2013.01); *F16D 2069/0441* (2013.01); *F16D 2300/08* (2013.01); *F16H 2045/0205* (2013.01);
(Continued)

(58) Field of Classification Search
CPC .......... F16D 13/64; F16D 13/66; F16D 13/68; F16H 2045/0205; F16H 2045/0278; F16H 2045/0289
See application file for complete search history.

(56) References Cited

U.S. PATENT DOCUMENTS 2,541,296 A * 2/1951 Saks ................. F16D 13/64
192/107 C
5,176,236 A * 1/1993 Ghidorzi .............. F16D 13/64
188/218 XL
(Continued)

FOREIGN PATENT DOCUMENTS

WO    2016130269 A1    8/2016

*Primary Examiner* — David R Morris
(74) *Attorney, Agent, or Firm* — LeKeisha M. Suggs

(57) ABSTRACT

A clutch plate assembly includes a central axis, a clutch plate with a first friction surface and a radially outer depressed portion, and a friction material ring. The friction material ring is bonded to the first friction surface and extends radially outside of the first friction surface such that an outer portion of the friction material ring is axially aligned with the clutch plate radially outer depressed portion. In an example embodiment, the first friction surface is disposed at an acute angle to a plane orthogonal to the central axis. In some example embodiments, the first friction surface is conical. In an example embodiment, the radially outer depressed portion is conical and axially offset from the first friction surface. In an example embodiment, the radially outer depressed portion is manufactured by machining, stamping, or coining.

14 Claims, 11 Drawing Sheets

(51) Int. Cl.
  *F16D 13/58* (2006.01)
  *F16D 69/04* (2006.01)
  *F16H 41/24* (2006.01)
  *F16D 13/64* (2006.01)
  *F16D 13/66* (2006.01)
  *F16D 65/12* (2006.01)
  *F16D 65/02* (2006.01)

(52) U.S. Cl.
  CPC ............... *F16H 2045/0221* (2013.01); *F16H 2045/0278* (2013.01); *F16H 2045/0289* (2013.01); *F16H 2045/0294* (2013.01)

(56) References Cited

U.S. PATENT DOCUMENTS

| | | | | |
|---|---|---|---|---|
| 5,975,260 | A * | 11/1999 | Fischer | F16H 45/02 192/107 R |
| 9,080,616 | B2 * | 7/2015 | Luipold | F16D 25/0638 |
| 9,285,030 | B2 * | 3/2016 | Lindemann | F16H 45/02 |
| 9,297,429 | B2 * | 3/2016 | Lindemann | F16D 33/18 |
| 9,303,700 | B2 * | 4/2016 | Lindemann | F16H 41/24 |
| 9,394,981 | B2 * | 7/2016 | Lindemann | F16H 45/02 |
| 9,803,735 | B2 * | 10/2017 | Lindemann | F16H 45/02 |
| 9,810,304 | B2 * | 11/2017 | Lindemann | F16H 45/02 |
| 9,816,564 | B2 * | 11/2017 | Avins | F16F 15/1232 |
| 9,816,596 | B1 * | 11/2017 | Nelson | F16H 45/02 |
| 9,822,861 | B2 * | 11/2017 | Avins | F16H 41/28 |
| 9,856,937 | B2 * | 1/2018 | Subotic | F16D 13/66 |
| 9,964,193 | B2 * | 5/2018 | Lindemann | F16H 45/02 |
| 10,030,752 | B2 * | 7/2018 | Lindemann | F16H 41/24 |
| 10,107,356 | B2 * | 10/2018 | Avins | F16F 15/1232 |
| 10,145,458 | B2 * | 12/2018 | Norwich | F16H 45/02 |
| 2012/0061202 | A1 | 3/2012 | Luipold et al. | |
| 2013/0230385 | A1 | 9/2013 | Lindemann et al. | |
| 2014/0097055 | A1 * | 4/2014 | Lindemann | F16H 41/24 192/3.21 |
| 2015/0021137 | A1 * | 1/2015 | Lindemann | F16H 45/02 192/3.29 |
| 2015/0027110 | A1 * | 1/2015 | Lindemann | F16H 41/24 60/338 |
| 2015/0068856 | A1 * | 3/2015 | Lindemann | F16H 45/02 192/3.25 |
| 2015/0068857 | A1 * | 3/2015 | Lindemann | F16D 33/18 192/3.28 |
| 2015/0308553 | A1 * | 10/2015 | Avins | F16H 41/28 192/3.29 |
| 2015/0345605 | A1 * | 12/2015 | Lindemann | F16D 13/64 192/3.28 |
| 2016/0123402 | A1 * | 5/2016 | Avins | F16F 15/1232 60/338 |
| 2016/0146324 | A1 * | 5/2016 | Lindemann | F16H 45/02 192/3.28 |
| 2016/0153534 | A1 * | 6/2016 | Lindemann | F16H 45/02 192/3.28 |
| 2016/0273636 | A1 * | 9/2016 | Lindemann | F16H 45/02 |
| 2016/0348736 | A1 * | 12/2016 | Subotic | F16D 13/66 |
| 2017/0211673 | A1 * | 7/2017 | Norwich | F16H 45/02 |
| 2017/0314638 | A1 * | 11/2017 | Avins | F16F 15/1232 |
| 2017/0314662 | A1 * | 11/2017 | Nelson | F16H 45/02 |
| 2018/0223975 | A1 * | 8/2018 | Lindemann | F16H 45/02 |

* cited by examiner

//---

CLUTCH PLATE ASSEMBLY WITH FRICTION MATERIAL FLAP

FIELD

The present disclosure relates generally to a clutch plate assembly, and more specifically to a clutch plate assembly with a friction material flap.

BACKGROUND

Clutch plate assemblies are known. One example is shown in commonly-assigned United States Patent Publication No. 2013/0230385.

BRIEF SUMMARY

Example aspects broadly comprise a clutch plate assembly including a central axis, a clutch plate with a first friction surface and a radially outer depressed portion, and a friction material ring. The friction material ring is bonded to the first friction surface and extends radially outside of the first friction surface such that an outer portion of the friction material ring is axially aligned with the clutch plate radially outer depressed portion. In an example embodiment, the first friction surface is disposed at an acute angle to a plane orthogonal to the central axis. In some example embodiments, the first friction surface is conical. In an example embodiment, the radially outer depressed portion is conical and axially offset from the first friction surface. In an example embodiment, the radially outer depressed portion is manufactured by machining, stamping, or coining.

In some example embodiments, the clutch plate assembly has a gap between the radially outer depressed portion and the friction material ring. In some example embodiments, the clutch plate assembly has a resilient element disposed in the gap. In an example embodiment, the resilient element is a diaphragm spring. In an example embodiment, the clutch plate has an outer lip for retaining the resilient element.

In some example embodiments, the friction material ring has a first portion with a first compressed thickness and a second portion with a second compressed thickness, greater than the first compressed thickness. In an example embodiment, at least a portion of the first portion is axially aligned with the first friction surface and at least a portion of the second portion is axially aligned with the radially outer depressed portion.

Other example aspects broadly comprise a turbine assembly with a shell including the clutch plate assembly and a plurality of blades fixed to the shell. Other example aspects broadly comprise a torque converter including the turbine assembly.

Other example aspects broadly comprise a torque converter including the clutch plate assembly. In some example embodiments, the torque converter has a housing. Only the second portion of the friction material ring contacts the housing when the clutch plate assembly is in a disengaged state. The first and second portions of the friction material ring contact the housing when the clutch plate assembly is in an engaged state. In an example embodiment, the housing has a second friction surface and the second portion of the friction material ring is arranged to contact the second friction surface. In an example embodiment, the second portion of the friction material ring is arranged to contact a radiused portion of the housing.

BRIEF DESCRIPTION OF THE DRAWINGS

The nature and mode of operation of the present disclosure will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. It is also understood that the terminology used herein is for the purpose of describing particular aspects only, and is not intended to limit the scope of the present disclosure, which is limited only by the appended claims.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
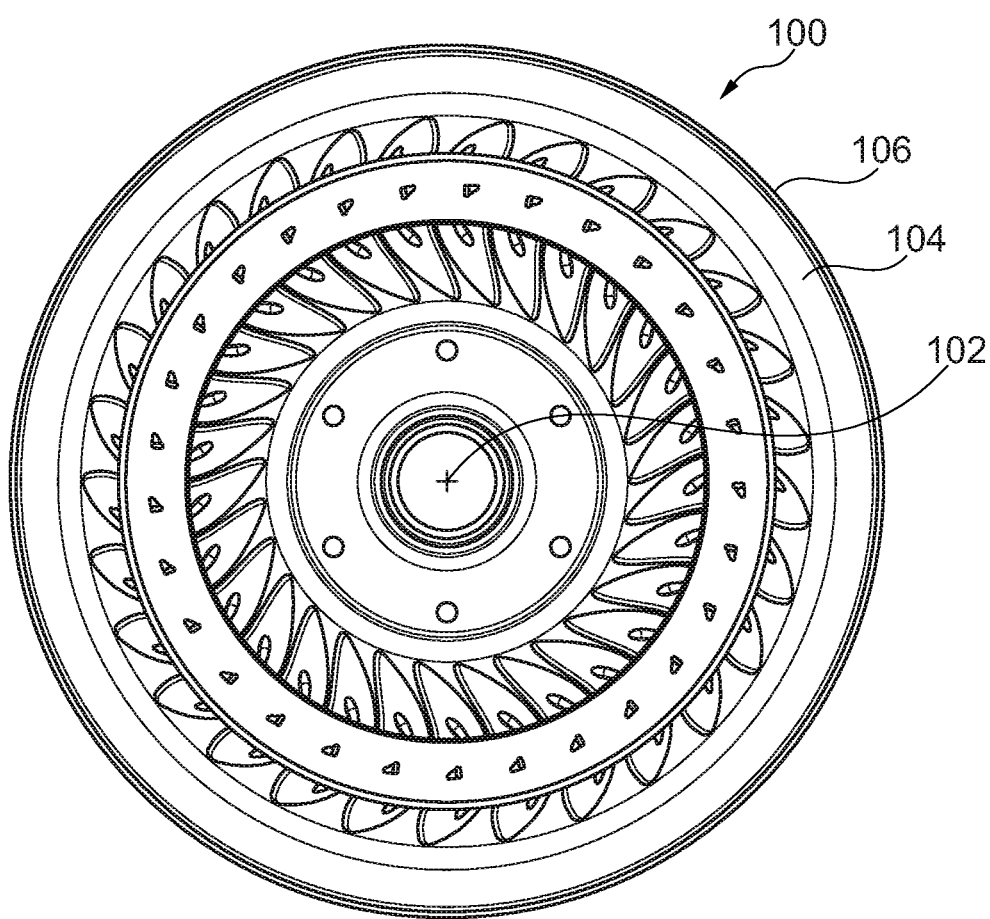
FIG. 1 is a plan view of a clutch plate according to an example aspect.
Figure 2:
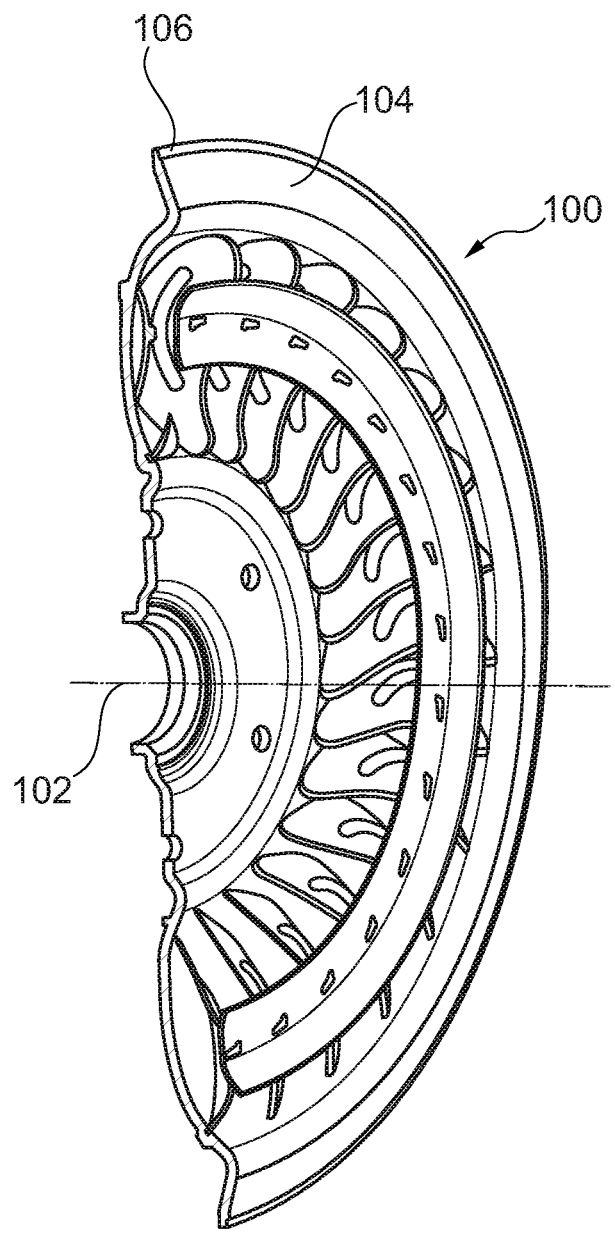
FIG. 2 is a sectioned perspective view of the clutch plate of FIG. 1.
Figure 3:
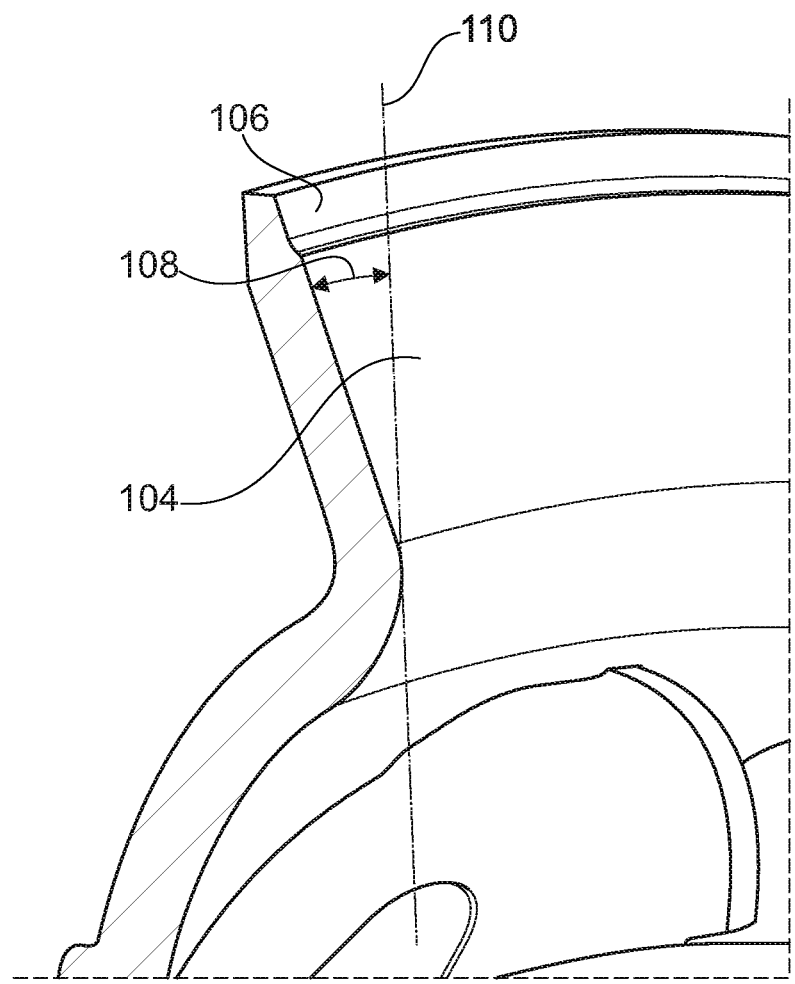
FIG. 3 is a detail perspective view of the clutch plate of FIG. 2.

The following description is made with reference to FIGS. 1-3. FIG. 1 is a plan view of clutch plate according 100 to an example aspect. FIG. 2 is a sectioned perspective view of the clutch plate of FIG. 1. FIG. 3 is a detail perspective view of the clutch plate of FIG. 2. Clutch plate 100 includes central axis 102, friction surface 104 and radially outer depressed portion 106. Friction surface 104 is disposed at acute angle 108 to plane 110 orthogonal to central axis 102. Although friction surface 104 is shown as conical, friction surface 104 may have other shapes. For example, friction surface 104 may be flat (not shown). In other words, friction surface 104 may be parallel to a surface orthogonal to the central axis 102. Radially outer depressed portion 106 is conical and axially offset from friction surface 104. Portion 106 may be manufactured by machining, stamping, or coining, for example.

Figure 4:
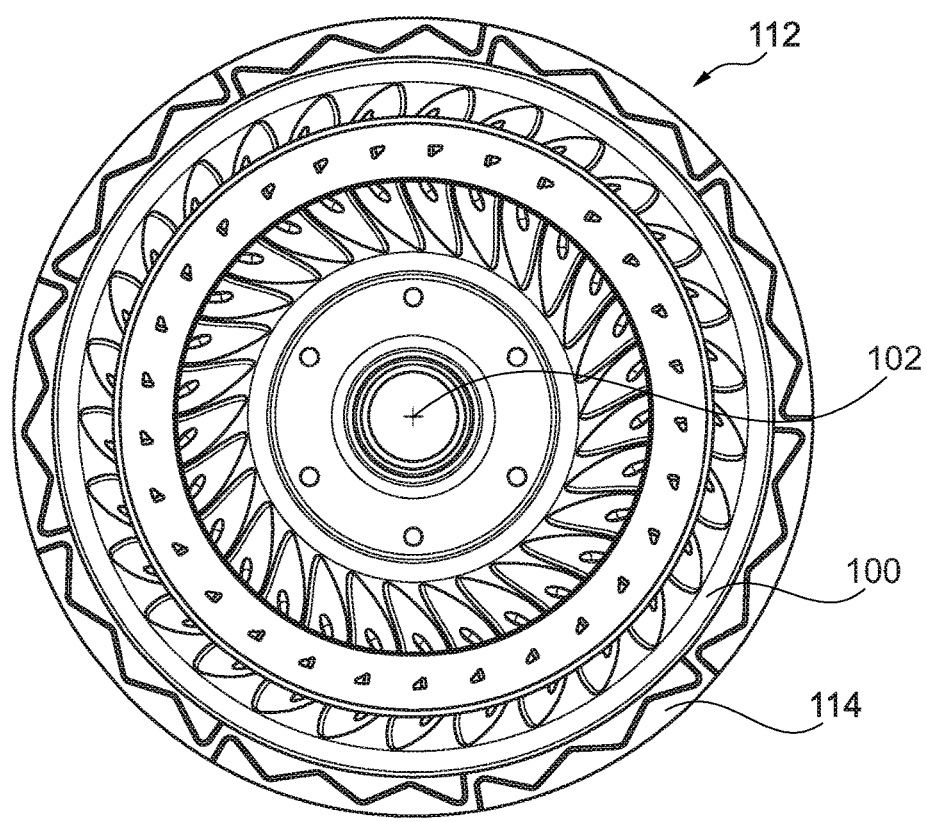
FIG. 4 is a plan view of a clutch plate assembly according to an example aspect.
Figure 5:
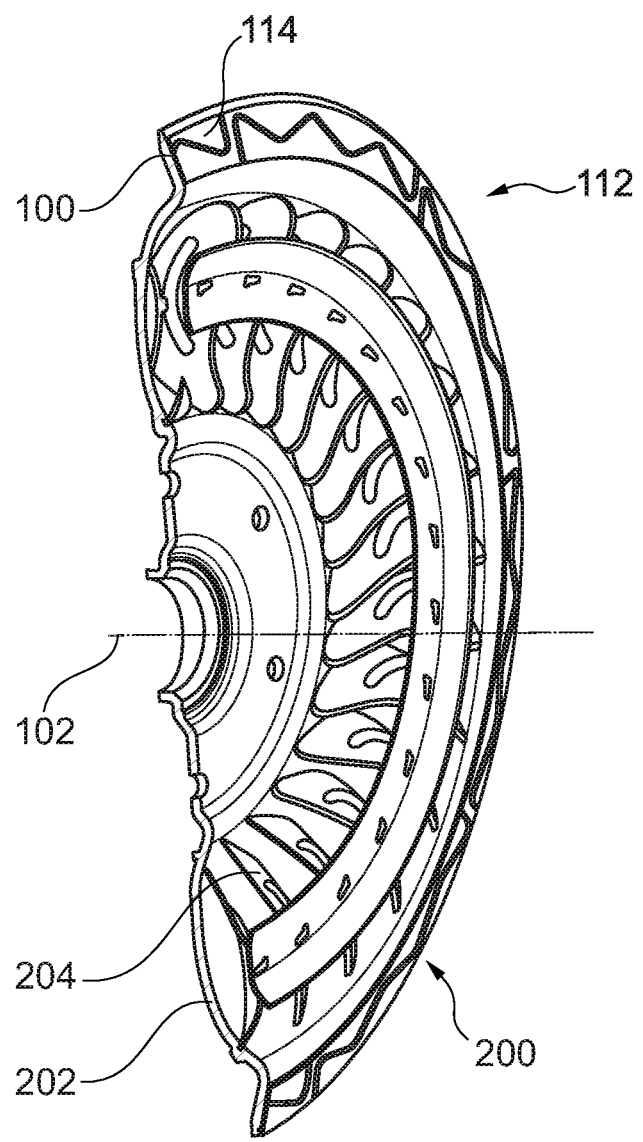
FIG. 5 is a sectioned perspective view of the clutch plate assembly of FIG. 4.
Figure 6:
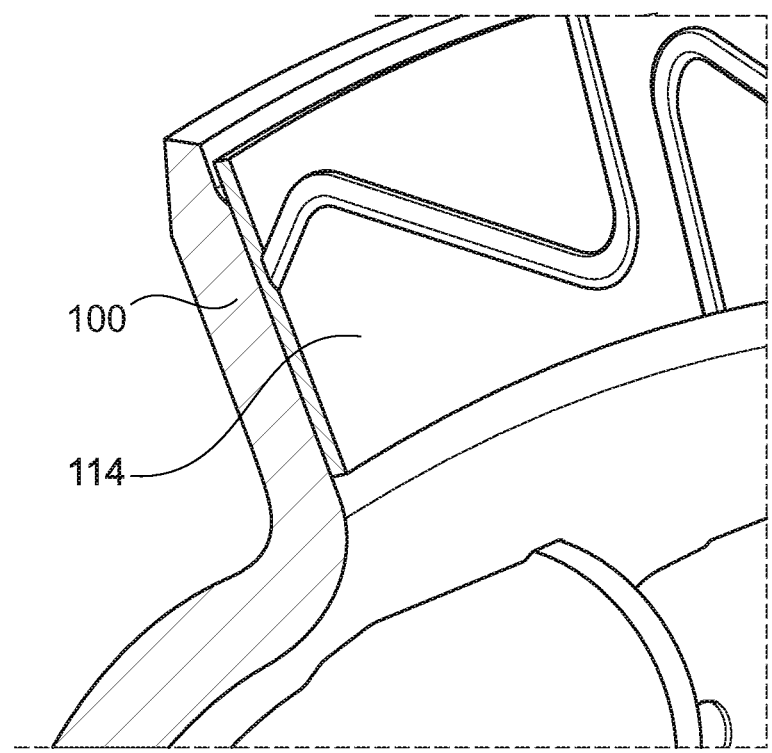
FIG. 6 is a detail perspective view of the clutch plate assembly of FIG. 5.
Figure 7:
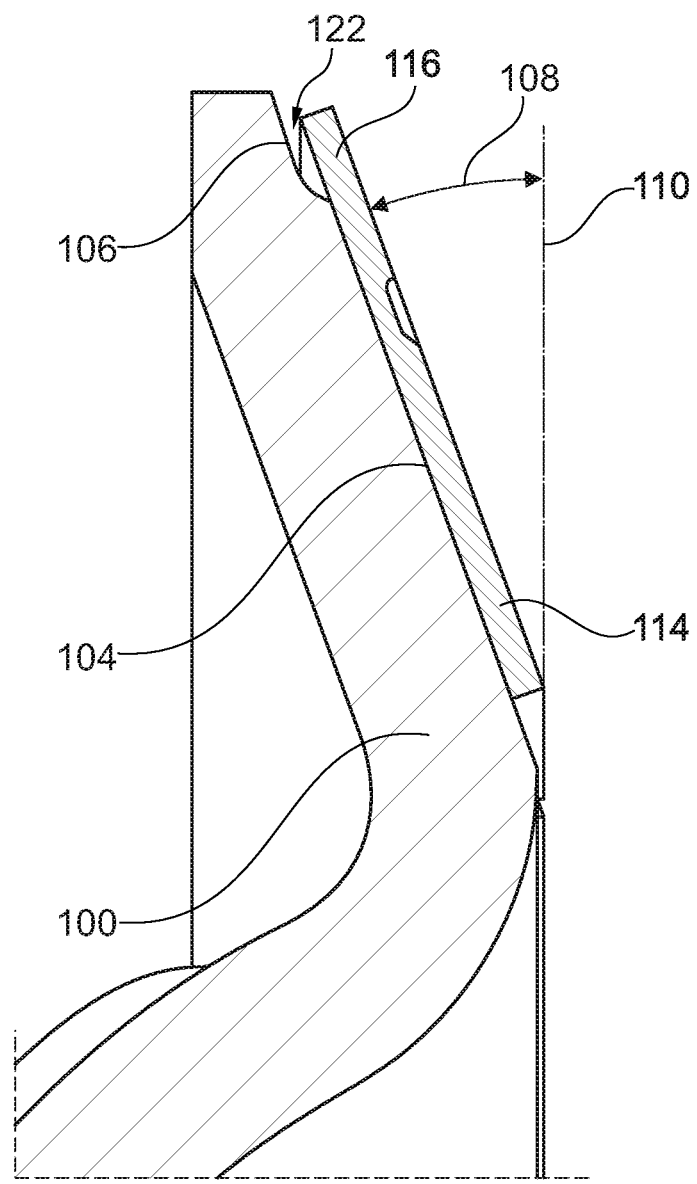
FIG. 7 is a detail section view of the clutch plate assembly of FIG. 4.

The following description is made with reference to FIGS. 4-7. FIG. 4 is a plan view of a clutch plate assembly according to an example aspect. FIG. 5 is a sectioned perspective view of the clutch plate assembly of FIG. 4. FIG. 6 is a detail perspective view of the clutch plate assembly of FIG. 5. FIG. 7 is a detail section view of the clutch plate assembly of FIG. 4. Clutch plate assembly 112 includes central axis 102, a clutch plate 100 and friction material ring 114. Friction material ring 114 is bonded to friction surface 104 by a heat-cured adhesive, for example, and extends radially outside of the friction surface 104 such that outer portion 116 of friction material ring 114 is axially aligned with clutch plate radially outer depressed portion 106. Outer portion 116 forms a deflectable friction material flap as is described in further detail below.

Figure 8:
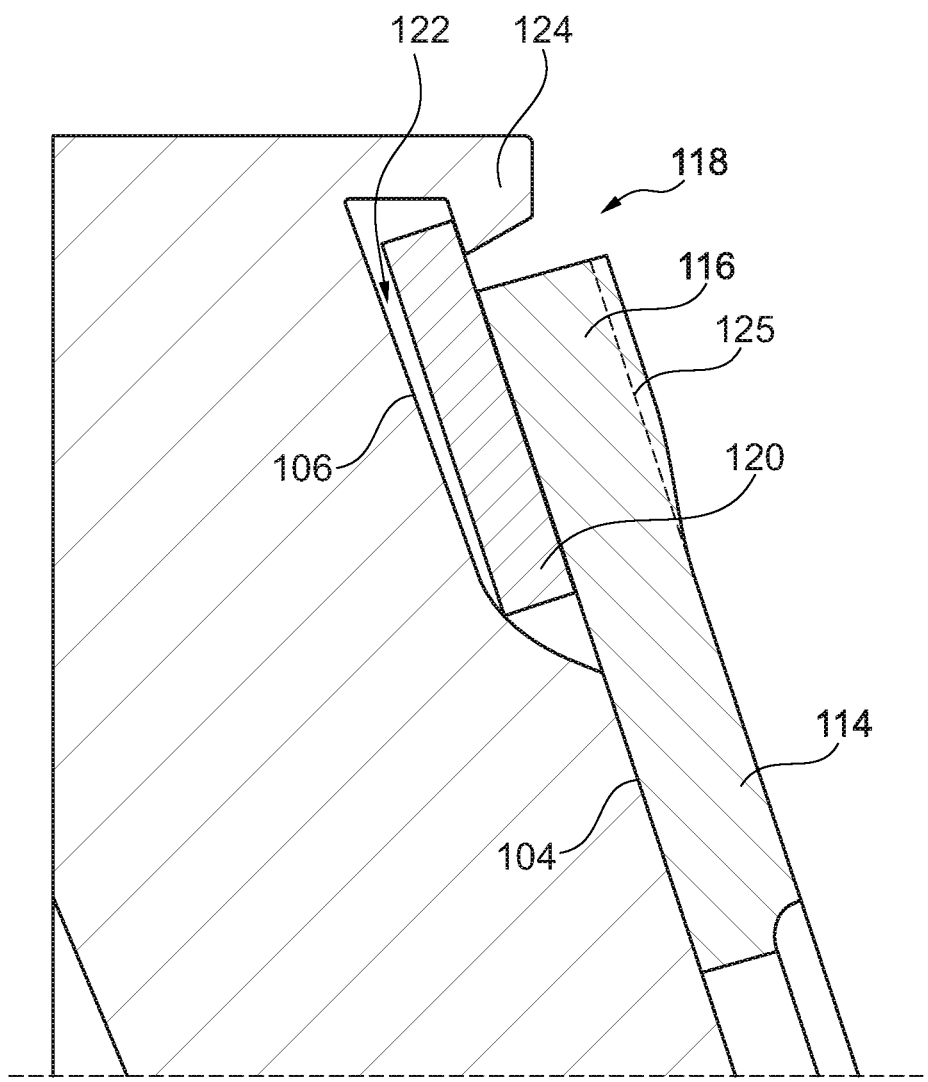
FIG. 8 is a detail section view of an alternative embodiment of the clutch plate assembly of FIG. 7 showing a resilient element.

The following description is made with reference to FIGS. 7-8. FIG. 8 is a detail section view of alternative embodiment 118 of the clutch plate assembly of FIG. 7 showing resilient element 120. Clutch plate assembly 112 includes gap 122 between radially outer depressed portion 106 and friction material ring 114. In the embodiment shown in FIG. 8, resilient element 120 is disposed in gap 122. Although resilient element 120 is shown as a diaphragm spring in FIG. 8, other types of resilient elements may be used. For example, a compressible rubber or a wave spring are possible. Clutch plate 100 includes outer lip 124 for retaining resilient element 120. Resilient element 120 deflects outer portion 116 of friction material ring 114 as indicated by dashed line 125 in FIG. 8.

Figure 9:
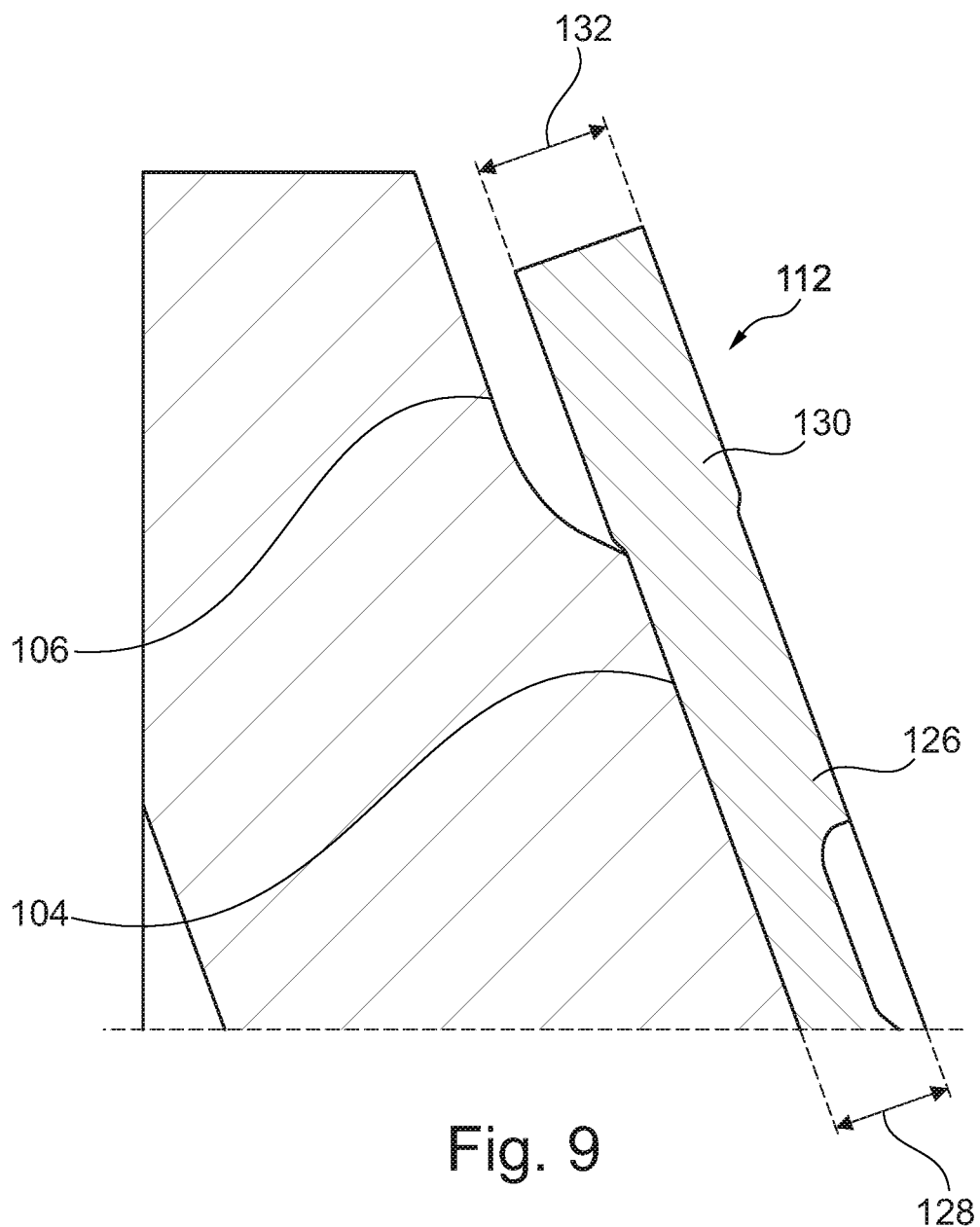
FIG. 9 is a detail section view of the clutch plate assembly of FIG. 7 showing varying compression of a friction material ring.

The following description is made with reference to FIG. 9. FIG. 9 is a detail section view of clutch plate assembly 112 of FIG. 7 showing varying compression of friction material ring 114. Friction material ring 114 includes portion 126 with compressed thickness 128 and portion 130 with compressed thickness 132, greater than thickness 128. Portion 126 is axially aligned with friction surface 104 and portion 130 is axially aligned with depressed portion 106. Thickness 132 is greater than thickness 128 due to compression of the friction material ring 114 during bonding. That is, because portion 130 is unsupported by gap 122, that portion does not get compressed when the clutch plate assembly is clamped in a bonding die. Returning to FIGS. 4-5, turbine assembly 200 includes shell 202 including clutch plate assembly 112 and blades 204 fixed to shell 202.

Figure 10:
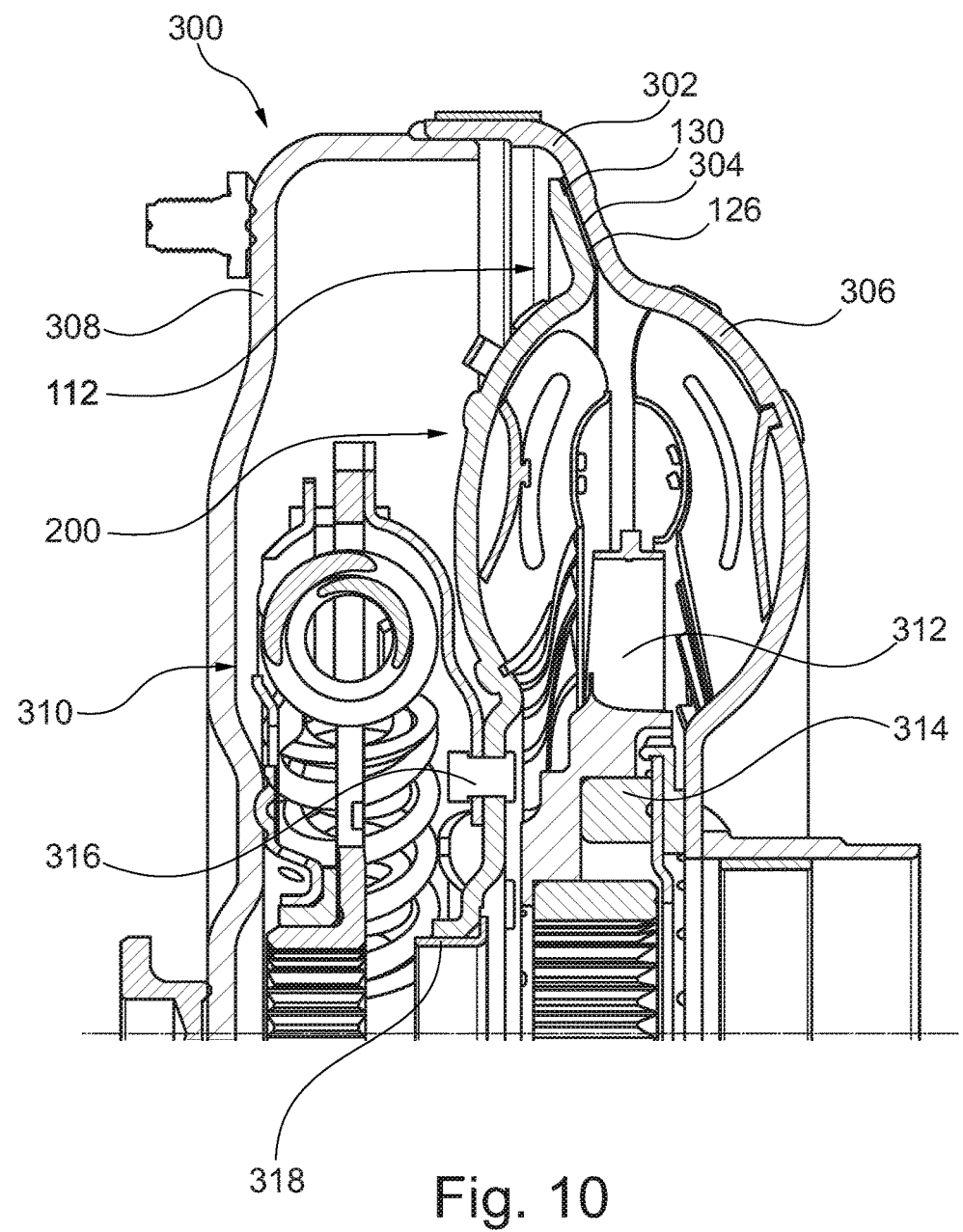
FIG. 10 is a section view of a torque converter including the clutch plate assembly of FIG. 4.
Figure 11:
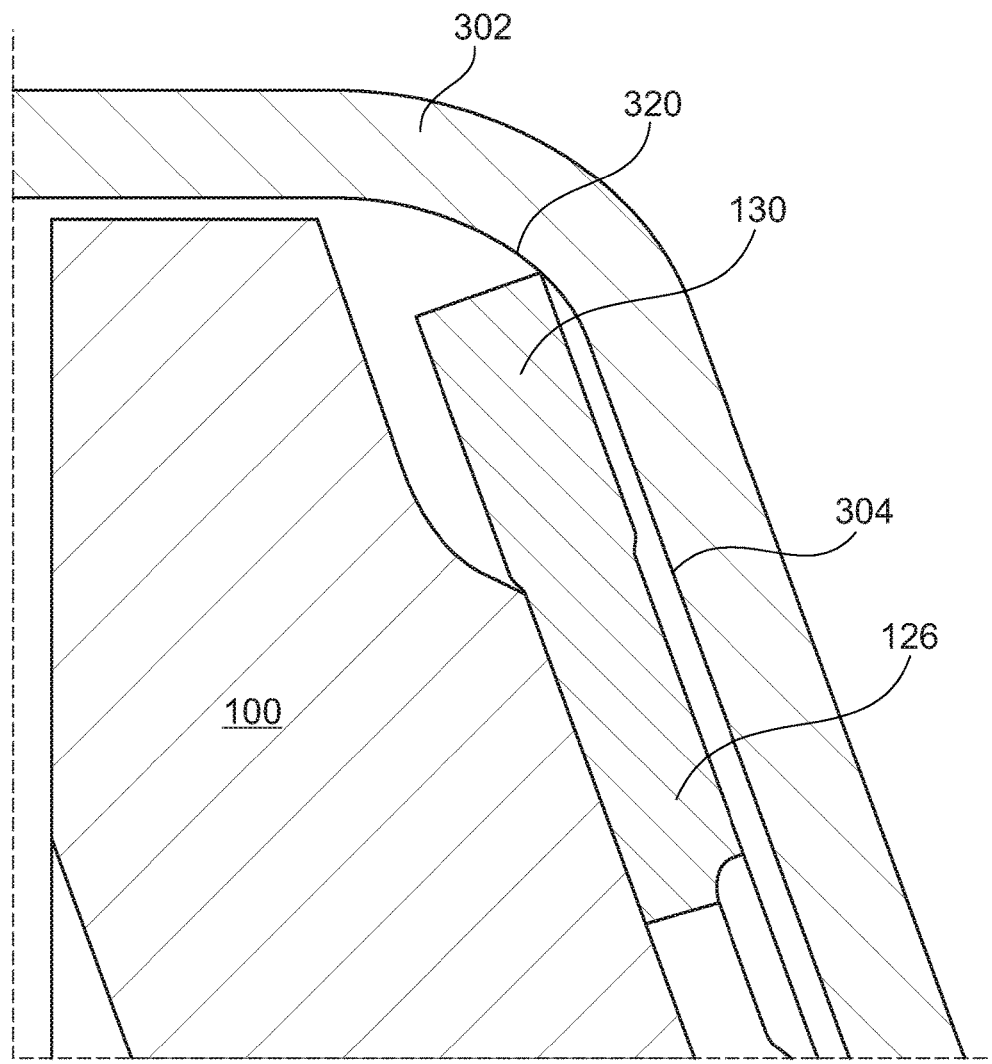
FIG. 11 is a detail view of an alternative embodiment of the torque converter of FIG. 10 showing a friction material ring in contact with a housing radius.

The following description is made with reference to FIGS. 10-11. FIG. 10 is a section view of torque converter 300 including clutch plate assembly 112 of FIG. 4. FIG. 11 is a detail view of an alternative embodiment of the torque converter of FIG. 10 showing a friction material ring in contact with a housing radius. Torque converter 300 includes turbine assembly 200. Torque converter 300 includes clutch plate assembly 112. Torque converter 300 includes housing 302. Only portion 130 of the friction material ring contacts housing 302 when the clutch plate assembly is in a disengaged state. Portions 126 and 130 of the friction material ring contact the housing when the clutch plate assembly is in an engaged state. Housing 302 includes friction surface 304 and portion 130 of the friction material ring is arranged to contact the friction surface 304.

Torque converter 300 includes impeller 306, cover 308, damper 310, and stator 312 with one-way clutch 314. Turbine 200 is fixed to damper 310 via rivet 316. Turbine assembly 200 includes bushing 318 for sealing to a transmission input shaft (not shown). Although friction surface 304 is shown on impeller 306, other configurations are possible. For example, friction surface 304 by be on cover 308 (not shown). As best shown in the alternative embodiment of FIG. 11, portion 130 of the friction material ring is arranged to contact radiused portion 320 of the housing.

The following description is made with reference to FIGS. 1-11. Resilient element 120 and thicker portion 130 keep friction material ring 114 in contact with housing 302 during a disengaged state of the clutch assembly. When engaged, the gap from the depressed portion allows the resilient element and/or the flap of the friction material ring to deflect towards clutch plate 100, allowing portion 126 to contact friction surface 304. Contact between friction material ring 114 and housing 302 seals the two components so that, when higher pressure is commanded in the torque converter to engage the clutch, fluid cannot leak past the friction surface, helping build pressure quicker and improving clutch response time.

Clutch plate assembly 112 advantageously keeps contact between friction material ring 114 and housing 302. This improves engagement during coast conditions (i.e., when the turbine rotates faster than the impeller) and overall clutch response (i.e., engagement time). Although the above description is made with reference to a turbine piston, clutch plate assembly 112 would also be advantageous in a conventional clutch application with a conventional piston plate.

Of course, changes and modifications to the above examples of the disclosure should be readily apparent to those having ordinary skill in the art, without departing from the spirit or scope of the disclosure as claimed. Although the disclosure is described by reference to specific preferred and/or example embodiments, it is clear that variations can be made without departing from the scope or spirit of the disclosure as claimed.

What we claim is:

1. A clutch plate assembly comprising:
a central axis;
a clutch plate comprising a first friction surface and a radially outer depressed portion;
a friction material ring bonded to the first friction surface and extending radially outside of the first friction surface such that an outer portion of the friction material ring is axially aligned with the clutch plate radially outer depressed portion, wherein a gap is defined between the radially outer depressed portion and the friction material ring; and
a resilient element disposed in the gap.

2. The clutch plate assembly of claim 1 wherein the first friction surface is disposed at an acute angle to a plane orthogonal to the central axis.

3. The clutch plate assembly of claim 1 wherein the first friction surface is conical.

4. The clutch plate assembly of claim 3 wherein the radially outer depressed portion is conical and axially offset from the first friction surface.

5. The clutch plate assembly of claim 1 wherein the radially outer depressed portion is manufactured by machining, stamping, or coining.

6. The clutch plate assembly of claim 1 wherein the resilient element is a diaphragm spring.

7. The clutch plate assembly of claim 1 wherein the clutch plate comprises an outer lip for retaining the resilient element.

8. The clutch plate assembly of claim 1 wherein the friction material ring comprises a first portion with a first compressed thickness and a second portion with a second compressed thickness, greater than the first compressed thickness.

9. The clutch plate assembly of claim 8 wherein at least a portion of the first portion is axially aligned with the first friction surface and at least a portion of the second portion is axially aligned with the radially outer depressed portion.

10. A turbine assembly comprising:
   a shell comprising a clutch plate assembly, the clutch plate assembly including:
      a clutch plate comprising a first friction surface and a radially outer depressed portion; and
      a friction material ring bonded to the first friction surface and extending radially outside of the first friction surface such that an outer portion of the friction material ring is axially aligned with the clutch plate radially outer depressed portion; and
   a plurality of blades fixed to the shell.

11. A torque converter comprising the turbine assembly of claim 10.

12. A torque converter comprising:
   a housing;
   a clutch plate assembly comprising:
      a clutch plate including a first friction surface and a radially outer depressed portion; and
      a friction material ring bonded to the first friction surface and extending radially outside of the first friction surface such that an outer portion of the friction material ring is axially aligned with the clutch plate radially outer depressed portion, wherein the friction material ring comprises a first portion with a first compressed thickness and a second portion with a second compressed thickness, greater than the first compressed thickness, wherein:
         only the second portion of the friction material ring contacts the housing when the clutch plate assembly is in a disengaged state; and,
         the first and second portions of the friction material ring contact the housing when the clutch plate assembly is in an engaged state.

13. The torque converter of claim 12 wherein the housing comprises a second friction surface and the second portion of the friction material ring is arranged to contact the second friction surface.

14. The torque converter of claim 12 wherein the second portion of the friction material ring is arranged to contact a radiused portion of the housing.

* * * * *